(12) United States Patent
Kemmer et al.

(10) Patent No.: US 8,874,350 B2
(45) Date of Patent: Oct. 28, 2014

(54) METHOD FOR DETERMINING A CONCENTRATION OF ALCOHOL IN A FUEL MIXTURE

(75) Inventors: Helerson Kemmer, Vaihingen (DE); Christian Reschke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 13/406,999

(22) Filed: Feb. 28, 2012

(65) Prior Publication Data

US 2012/0226427 A1 Sep. 6, 2012

(30) Foreign Application Priority Data

Mar. 4, 2011 (DE) .......................... 10 2011 005 134

(51) Int. Cl.
  F02D 41/30 (2006.01)
  F02D 41/00 (2006.01)
  F02D 19/08 (2006.01)

(52) U.S. Cl.
  CPC .......... *F02D 41/0025* (2013.01); *F02D 19/084* (2013.01); *F02D 19/085* (2013.01); *Y02T 10/36* (2013.01); *F02D 2200/0612* (2013.01)
  USPC .......................................... 701/103; 701/109

(58) Field of Classification Search
  USPC .......... 701/102–105, 109, 111, 114; 123/1 A, 123/27 R, 27 GE, 299–305, 434, 478–480, 123/525, 575
  See application file for complete search history.

(56) References Cited

U.S. PATENT DOCUMENTS

| 5,183,021 | A | * | 2/1993 | Suga et al. | 123/478 |
| 6,109,025 | A | * | 8/2000 | Murata et al. | 60/297 |
| 6,804,951 | B2 | * | 10/2004 | Nader et al. | 60/277 |
| 7,793,536 | B2 | | 9/2010 | Schenck Zu Schweinsberg et al. | |
| 8,185,293 | B2 | * | 5/2012 | Jiang et al. | 701/102 |
| 8,578,913 | B2 | * | 11/2013 | Yoshioka et al. | 123/518 |
| 2005/0126551 | A1 | * | 6/2005 | Mello et al. | 123/549 |
| 2007/0289573 | A1 | * | 12/2007 | Leone et al. | 123/305 |
| 2009/0082947 | A1 | * | 3/2009 | Tashima | 701/109 |
| 2009/0107113 | A1 | * | 4/2009 | Thanasiu et al. | 60/276 |
| 2009/0248279 | A1 | * | 10/2009 | Ito et al. | 701/109 |
| 2009/0283078 | A1 | * | 11/2009 | Okubo | 123/575 |
| 2011/0166771 | A1 | * | 7/2011 | Mitani et al. | 701/104 |
| 2011/0191006 | A1 | * | 8/2011 | Nishida et al. | 701/103 |

FOREIGN PATENT DOCUMENTS

| DE | 102007023899 | 11/2008 |
| DE | 102007054813 | 5/2009 |
| DE | 102008002493 | 12/2009 |
| DE | 102008040798 | 2/2010 |

* cited by examiner

*Primary Examiner* — John Kwon
*Assistant Examiner* — Johnny H Hoang
(74) *Attorney, Agent, or Firm* — Kenyon & Kenyon LLP

(57) ABSTRACT

A method for determining a concentration of alcohol in a fuel mixture, where a characteristic curve for a parameter describing the dynamics of an injector, by which the fuel mixture is injected in an internal combustion engine, is ascertained; and where the concentration of alcohol is determined in light of a course of the characteristic curve. The invention also relates to a method for operating an internal combustion engine and a system for determining a concentration of alcohol in a fuel mixture.

11 Claims, 3 Drawing Sheets

METHOD FOR DETERMINING A CONCENTRATION OF ALCOHOL IN A FUEL MIXTURE

CROSS-REFERENCE

The present application claims the benefit under 35 U.S.C. §119 of German Patent Application No. DE 102011005134.1 filed on Mar. 4, 2011, which is expressly incorporated herein by reference in its entirety.

FIELD OF THE INVENTION

The present invention relates to a method for determining a concentration of alcohol in a fuel mixture, a method for operating an internal combustion engine and a system for determining a concentration of alcohol in a fuel mixture.

BACKGROUND INFORMATION

Ethanol from plant cultivation represents a possibility for a renewable energy and is suited as a fuel for operating internal combustion engines using the Otto cycle. Combustion engines, which are operated in the so-called flex-fuel mode, may be operated using a conventional hydrocarbon compound, e.g., gasoline, as well as alcohol, e.g., ethanol, or using any mixture of these two fuels. However, in this connection, a software functionality of a control unit for controlling the combustion engine must be adapted to a current mixture ratio of the alcohol (ethanol) and the hydrocarbon compound (gasoline). The alcohol concentration of a utilized fuel mixture must be known for this, since several operational characteristics maps of the engine control unit depend on it. As a rule, an ethanol sensor is used for determining the ethanol concentration.

German Patent Application No. DE 10 2008 002 493 A1 describes a method and a device for determining the composition of a fuel mixture made up of a first and at least one second fuel for operating an internal combustion engine, the combustion engine having a fuel metering device and at least one exhaust gas analyzer probe in an exhaust duct. In this connection, it is provided that the composition of the fuel mixture be determined from a signal for a pump current or for a change in pump current of a pump cell of the exhaust gas analyzer probe, the signal being a function of the components of the exhaust gas. In this context, the exhaust gas analyzer probe is configured as a wide-range lambda probe, which is situated close to the engine, in front of a first catalytic converter in the direction of the flow of exhaust gas. The composition of a fuel mixture is used in a combustion engine operated in flex-fuel mode. The use of a wide-range lambda probe allows additional sensors to be dispensed with, which produces cost advantages.

A further method for determining the composition of a fuel mixture is described in German Patent Application No. DE 10 2008 040 798 A1. In this connection, a first and at least one second fuel are used for operating an internal combustion engine, the combustion engine being controlled by an engine control unit, and the composition of the fuel mixture being determined by a fuel composition sensor. The fuel mixtures of varying composition have different specific heat capacities and/or different thermal conductivities. It is provided that a temperature sensor having a temperature-dependent electrical resistance be used as a fuel composition sensor, and that the fuel mixture be supplied to the temperature sensor. In a first measuring phase, the temperature of the fuel mixture is determined by the temperature sensor. In a second measuring phase, the temperature sensor is acted upon by a heating current and heated. In a third measuring phase, the heating current is switched off, and, from the time characteristic of the electrical resistance of the temperature sensor or a characteristic quantity derived from it during the second and/or third measuring phase, the composition of the fuel mixture is determined from its temperature and flow velocity at the temperature sensor.

A similar method for determining the composition of a fuel mixture is described in German Patent Application No. DE 10 2007 054 813 A1. In this, a heating element is provided for preheating and/or for evaporating the fuel mixture. In this case, use is made of the fact that fuel mixtures of varying composition have different specific heat capacities and/or different heats of vaporization and/or different boiling points. In this context, it is provided that the fuel mixture be fed to the heating element, and that the heat energy removed from the heating element by the fuel mixture, or a characteristic quantity dependent on it, be determined. The composition of the fuel mixture is determined from a heat energy removed from the heating element, or from the characteristic quantity dependent on it. The method allows the composition of a fuel mixture in an internal combustion engine operated in flex-fuel mode to be determined in an accurate and reliable manner.

German Patent Application No. DE 10 2007 023 899 A1 also describes a method for determining the composition of a fuel mixture made up of a first and at least one second fuel for operating an internal combustion engine having at least one combustion chamber; it also being taken into account that the first and the at least one second fuel have different boiling points and/or different enthalpies of vaporization. In this case, the composition of the fuel mixture is ascertained from the pressure in the combustion chamber and/or from a characteristic quantity linked to the pressure and/or from the time characteristic of the pressure and/or from the time characteristic of a characteristic quantity linked to the pressure, during and/or after an injection of fuel during a compression phase of the fuel-air mixture.

SUMMARY

Against this background, two example methods and an example system are described. Further refinements of the present invention follow from the description below.

In accordance with an example method, an ethanol concentration and, therefore, the alcohol concentration of a fuel mixture is ascertained by analyzing opening and/or closing dynamics of at least one injector, typically a high-pressure injector (HPFI), of an injection system of an internal combustion engine. In this analysis, a current characteristic curve of the opening and/or closing dynamics is normally ascertained by measurement. In addition, the ascertained characteristic curve is compared to at least one stored reference characteristic. In this context, as a rule, several reference characteristics for different compositions of the fuel mixture, the alcohol, normally ethanol, and at least one hydrocarbon compound, e.g., gasoline, are used. The reference characteristics are ascertained using known compositions of the fuel mixture.

The fuel, usually a fuel mixture, contains, in addition to the alcohol generally present in the form of ethanol, at least one hydrocarbon compound, such as gasoline or diesel. If the alcohol concentration of the fuel mixture is known after implementing an embodiment of the example method according to the present invention, then consequently, the ratio of the alcohol (ethanol) to the at least one hydrocarbon compound may also be determined. In comparison with other sensorless methods for ascertaining the alcohol (ethanol) concentration, one variant of the present invention also provides for this to be ascertained immediately prior to injection. Therefore, errors in the adaptation of the operational characteristics maps of the combustion engine, due to mixing processes of a fuel system after switching fuels, e.g., from gasoline to ethanol or vice versa, are reduced.

Using the described example method, different, machine-specific friction forces of the components of the fuel mixture, that is, of at least one hydrocarbon compound and of the alcohol normally present in the form of ethanol, are determined. Using the method provided within the scope of the present invention, the use of a sensor for determining the alcohol concentration may be dispensed with. To analyze the opening and/or closing dynamics of the injector, a component of a combustion engine that is already present may be used for implementing the example method. The example method may be executed using, inter alia, high-pressure injectors such as the HDEV5 of Robert Bosch GmbH. Consequently, the alcohol, i.e., ethanol, concentration in the fuel mixture is detected without the use of an ethanol sensor, which means that costs are reduced. The example method is suitable, e.g., for combustion engines using the Otto cycle (PFI and GDI Otto engines), when the opening and/or closing duration of the injector varies with the alcohol concentration of the fuel mixture used as a working medium.

In an embodiment of the method, an opening and closing time of the injector is determined. The characteristic curve for determining at least one of the above-mentioned times may be based, in turn, on the voltage signal, the knock sensor signal or something similar to that. Differences of individual valves in the range of a few µs are detectable by the described method.

The example system of the present invention is configured to perform all of the steps of the above-described example method for determining an alcohol concentration in a fuel mixture. In this context, individual steps of this example method are also able to be implemented by individual components of the example system. In addition, functions of the example system, or functions of individual components of the example system, may be implemented as steps of the method. Furthermore, it is possible to implement steps of the method as functions of at least one component of the system or of the entire system.

Additional advantages and developments of the present invention are derived from the description and the figures.

It will be appreciated that the features mentioned above and the features described below may be used not only in the combination given in each case, but also in other combinations or individually, without departing from the scope of the present invention.

DETAILED DESCRIPTION OF EXAMPLE EMBODIMENTS

The present invention is represented schematically in the figures with the aid of specific embodiments, and is described in detail below with reference to the figures.

Figure 1:
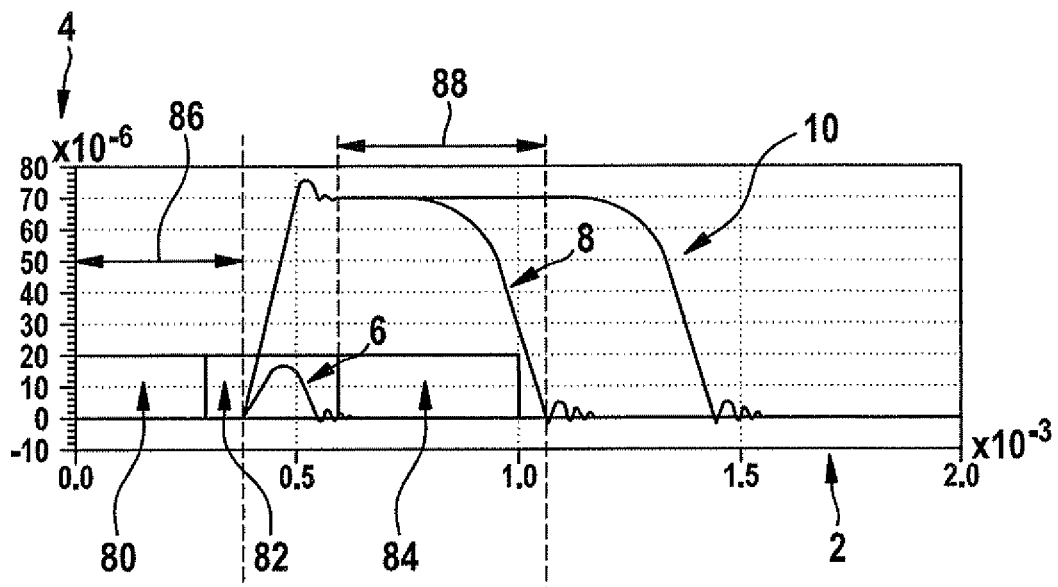
FIG. 1 shows a graph having examples of first reference characteristics for different injection times, which are used in a specific embodiment of the method of the present invention.
Figure 2:
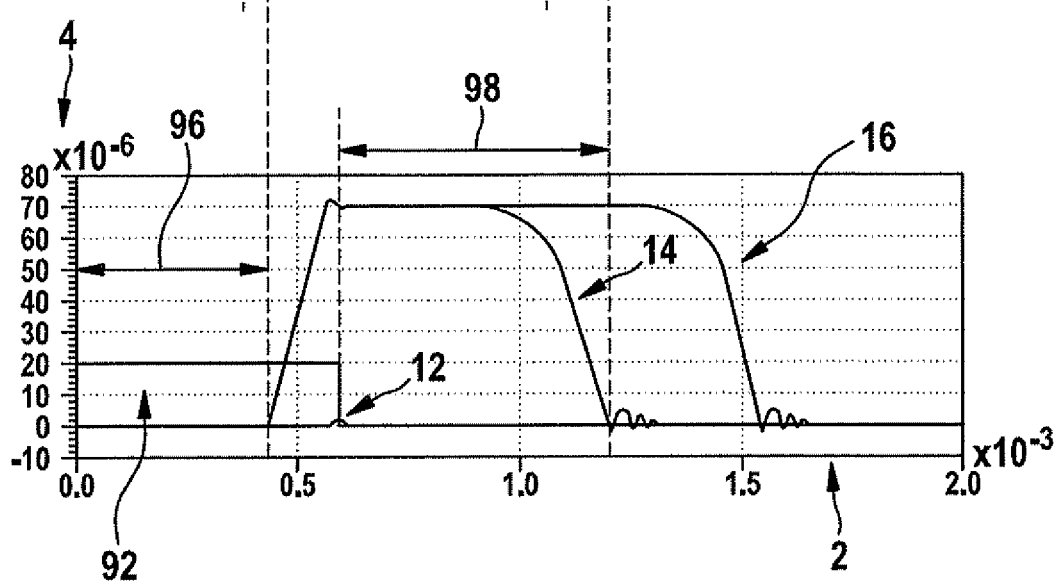
FIG. 2 shows a graph having examples of second reference characteristics for different injection times, which are used in a specific embodiment of the method of the present invention.

The graphs shown in FIGS. 1 and 2 each include an abscissa 2, along which the time is plotted in seconds. In each instance, a lift of a valve needle of an injector of an internal combustion engine is plotted in meters along a coordinate 4.

Three reference characteristics 6, 8, 10 are plotted in the graph of FIG. 1, the reference characteristics having been ascertained by simulation and showing a course of the lift of the valve needle of the injector, when a fuel mixture injected by the injector merely contains gasoline as a hydrocarbon compound, but no alcohol. In this context, a first reference characteristic 6 is produced in the case of an injection time ti of 0.3 ms, a second reference characteristic 8 is produced in the case of an injection time ti of 0.6 ms, and a third reference characteristic 10 is produced in the case of an injection time ti of 1.0 ms.

In addition, a first activation instance 80 for injection time ti=0.3 ms, a second activation instance 82 for injection time ti=0.6 ms, and a third activation instance 84 for injection time ti=1 ms are indicated in the graph of FIG. 1. Here, opening time 86 $t_{o\text{-}gas}$ for second activation instance 82 in the case of injection time ti=0.6 ms is shown by a first double arrow, when the fuel mixture only contains gasoline. The second double arrow indicates closing time 88 $t_{o\text{-}gas}$, which results in the case of the second activation instance having injection time ti=0.6 ms.

The graph of FIG. 2 likewise shows three reference characteristics 12, 14, 16, which are ascertained by simulation and result for a lift of the valve needle of the injector, when a fuel mixture, which merely contains ethanol and, consequently, only an alcohol, but no hydrocarbon compound, is injected by the injector. In this context, first reference characteristic 12 represents the lift of the valve needle in the case of an injection time ti of 0.3 ms, second reference characteristic 14 represents the lift of the valve needle in the case of an injection time ti of 0.6 ms, and third reference characteristic 16 represents the lift of the valve needle in the case of an injection time ti of 1.0 ms.

A second activation instance 92 for injection time ti=0.6 ms is indicated in the graph of FIG. 2. In addition, opening time 96 $t_{o\text{-}eth}$ for second activation instance 92 in the case of injection time ti=0.6 ms is shown here by a first double arrow, when the fuel mixture merely contains ethanol as alcohol. The second double arrow indicates closing time 98 $t_{o\text{-}eth}$, which results in the case of second activation instance 92 having injection time ti=0.6 ms.

As shown by the graphs of FIGS. 1 and 2 for the lift movements of a valve needle of the injector, which are formed by simulation, are represented as reference characteristics 6, 8, 10, 12, 14, 16, and have gasoline or ethanol as a fuel mixture, marked differences in the dynamic response are produced as a function of the composition of the injected fuel mixture, and consequently, as a function of the type of injected fuel. This may be attributed to different, media-specific friction forces and compressive forces, which describe the dynamics of the injector as possible parameters.

From viewing the graphs of FIGS. 1 and 2 as a whole, a differential opening time 100 $\Delta t_o$ is apparent for the case of second activation instance 82, 92 for an injection time t=0.6 ms, where $\Delta t = t_{o\text{-}eth} - t_{o\text{-}gas}$; and a differential closing time 102 $\Delta t_c$ is apparent, where $\Delta t_c = \Delta t_{c\text{-}eth} - t_{c\text{-}gas}$.

In the case of long injection times, e.g., ti=0.6 ms and ti=1.0 ms, opening times 86 $t_{c\text{-}gas}$ and 96 $t_{o\text{-}eth}$ differ, for example, by differential opening time 100 $\Delta t_o \approx 60$ μs, and closing times 88 $t_{c\text{-}gas}$ and 98 $t_{c\text{-}eth}$ even differ by differential closing time 102 $\Delta t_c \approx 130$ μs. In this context, at all of the injection times, the injector is opened and closed earlier when using the hydrocarbon compound taking the form of gasoline, than is the case when using ethanol as an alcohol. In addition, in the case of a short injection time of ti=0.3 ms, the lift of the valve needle is very small and delayed with alcohol and therefore differs even more markedly from the movement of the valve needle than is the case with the use of gasoline. In the scope of the present invention, values for opening times 86 $t_{o\text{-}gas}$, 96 $t_{o\text{-}eth}$ and closing times 88 $t_{c\text{-}gas}$, 98 $t_{c\text{-}eth}$ for different injection times and different compositions of the fuel mixture may be stored as features of reference characteristics 6, 8, 10, 12, 14, 16.

Figure 3:
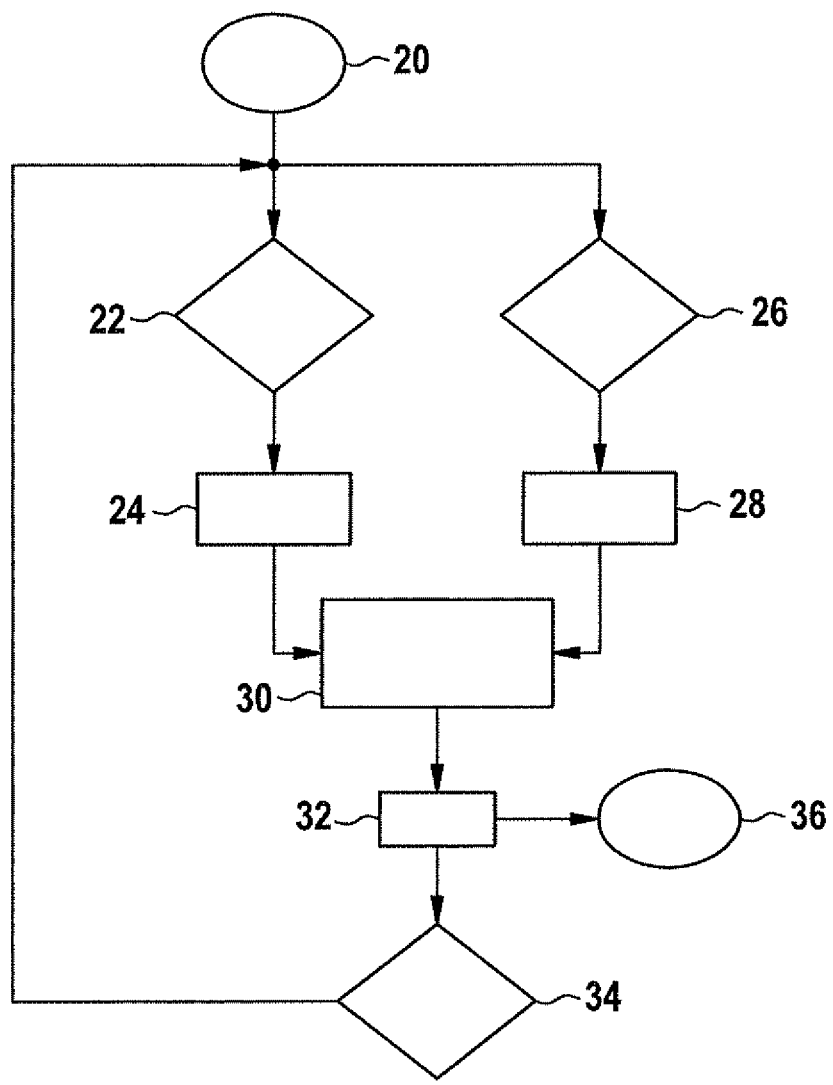
FIG. 3 shows a chart of the sequence of a specific embodiment of the method according to the present invention.

In one specific embodiment of the method according to the present invention, the relationships between opening times 86 $t_{o\text{-}gas}$, 96 $t_{o\text{-}eth}$ and closing times 88 $t_{o\text{-}gas}$, 98 $t_{c\text{-}eth}$ for different compositions of the fuel mixtures, which are represented in the graphs of FIGS. 1 and 2, are used for an ascertaining algorithm of the alcohol concentration, as illustrated in FIG. 3 with the aid of a chart. In this connection, a characteristic curve produced in the case of a particular injection time ti is compared to the reference characteristics 6, 8, 10, 12, 14, 16, and typically, the resulting opening and closing times are compared to opening and closing times 86, 88, 96, 98, and a composition of the fuel mixture is ascertained from this. In this context, a functional relationship of opening and closing times 86 $t_{o\text{-}gas}$, 88 $t_{c\text{-}gas}$, 96 $t_{o\text{-}eth}$, 98 $t_{c\text{-}eth}$ and the concentration of alcohol and gasoline in the fuel mixture may be considered.

In one specific embodiment of the method according to the present invention, the relationships illustrated in the graphs of FIGS. 1 and 2 are used for an ascertaining algorithm of the alcohol concentration, as illustrated in FIG. 3 with the aid of a chart.

After detection of an instance of refueling 20, a first characteristic curve for a variation of an opening duration 22 of the injector is ascertained, and after, e.g., one minute, it is checked if a first threshold value for an opening time of, e.g., 10 μs has been reached. Subsequently, the alcohol concentration is calculated 24 from the first characteristic curve.

At the same time, a second characteristic curve for a variation of a closing duration 26 is ascertained, and after, e.g., one minute, it is checked if a second threshold value for a closing time, e.g., 10 μs, has been reached. Subsequently, the alcohol concentration is calculated 28 from the second characteristic curve.

In addition, in a plausibility check 30, the opening duration and closing duration of the injector, which have been newly ascertained by one of the above-mentioned methods, are compared to the values for the same injection times ti, prior to the refueling. Since, in the case of normal wear, the change in these quantities occurs rather slowly and/or only after several hundred hours of operation, then, in the event of a deviation within a small time span, e.g., from one to a few minutes, which deviation is greater than certain, introduced threshold values, it is possible to deduce that a different medium is in the fuel analysis or even in the injector.

By comparing the ascertained characteristic curves to at least one reference characteristic stored in the control unit, in a method step for the determination 32, the corresponding alcohol concentration is ascertained from the variation of the opening duration ascertained in this manner, in the case of an injection time ti. If a change in the alcohol concentration should exceed a threshold value of, e.g., greater than 5%, then the method is continued with the steps for varying the opening duration 22 and for varying the closing duration 26.

Accordingly, the alcohol concentration ascertained in this manner is ascertained from the variation of the opening duration 24 and the variation of the closing duration 26, compensated for, and checked for plausibility. Furthermore, an opening and closing duration altered by the change in the ethanol concentration is also detected to the same degree in the case of other injection times ti and injectors, apart from valve-specific differences in the ethanol concentration, which may be attributed to peculiarities in the fuel flow. Consequently, the new alcohol concentration may be calculated from different sources. In this connection, it may also be provided that a mean of the plausible values be calculated. An operating strategy for the internal combustion engine is adapted in accordance with the newly ascertained alcohol concentration.

The determination of the alcohol concentration and a corresponding adaptation 36 of the operating strategy are continued until the value stabilizes within a stipulated range. Therefore, after switching fuels from gasoline to alcohol or vice versa, the operation of the combustion engine may be ensured in accordance with the alcohol concentration actually present in the injectors.

A valve-specific determination of the alcohol concentration, in this case, of the ethanol concentration, along with corresponding, valve-specific correction of the operational characteristics maps, is also possible and takes place in a similar manner.

Figure 4:
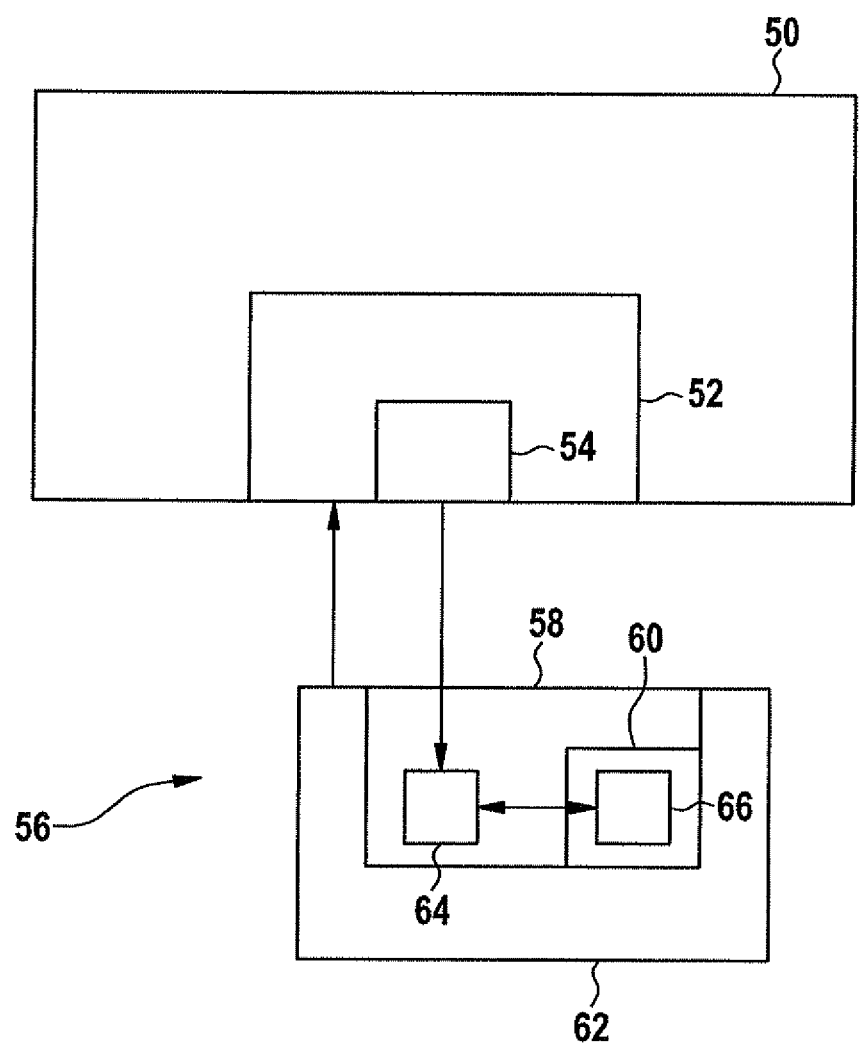
FIG. 4 shows a schematic representation of a specific embodiment of a system according to the present invention.

FIG. 4 shows a schematic representation of an internal combustion engine 50 of a motor vehicle, the combustion engine including an injection system 52 having at least one injector 54. In addition, FIG. 4 shows a specific embodiment of a system 56, which includes a module 58 having a memory 60. In the present, specific embodiment, module 58 is situated in a control unit 62 of the motor vehicle. Regardless of whether or not a specific embodiment of the method according to the present invention is implemented using the injector, the at least one injector 54 is situated in combustion engine 50 as a component of the injection system 52 of it.

The at least one injector 54 is configured to inject a fuel mixture, which is made up of a hydrocarbon compound, e.g., gasoline, and an alcohol, e.g., ethanol, into a combustion chamber of the combustion engine. In one variant of the method according to the present invention, the at least one injector 54 is used for determining an alcohol concentration in the described fuel mixture. In this context, the at least one injector 54 cooperates with module 58 and accordingly, depending on definition, may also be considered a component of the specific embodiment of the system 56 of the present invention, which is shown in FIG. 4.

To implement the specific embodiment of the method according to the present invention, in a conventional mode of combustion engine 50, a characteristic curve 64 is determined, in view of an injection time, for a course of a lift of a valve needle of injector 54 and, therefore, for a parameter describing the dynamics of injector 54. It is provided that several reference characteristics 66 for curves of the lift of the valve needle of injector 54 be stored in memory 60. These reference characteristics 66 were ascertained for different injection times, for different concentrations of alcohol, in this case, ethanol, in the fuel mixture, which otherwise contains at least one hydrocarbon compound, in this case, gasoline.

To determine the alcohol concentration in the fuel mixture, the characteristic curve 64 ascertained during the operation of the combustion engine is compared to at least one reference characteristic 66. Normally, several characteristic curves 64 are ascertained for different injection times. In this context, ascertained characteristic curves 64 are checked to determine the opening times at which the injector is opened and the closing times at which it is closed. The ascertained opening and/or closing times are compared to known opening and/or closing times of stored reference characteristics 66. If the mentioned opening and/or closing times substantially correspond to opening and/or closing times of a reference characteristic, which were ascertained for a particular alcohol concentration, then the fuel mixture used may be assigned the particular alcohol concentration.

If the alcohol concentration is known, then starting out from control unit 62, it is further used for adjusting at least one parameter and, therefore, an operating strategy of injection system 52 and, consequently, of combustion engine 50.

What is claimed is:

1. A method for determining a concentration of alcohol in a fuel mixture, comprising:
    ascertaining a characteristic curve for a parameter describing dynamics of an injector, by which the fuel mixture is injected in an internal combustion engine; and
    determining the concentration of alcohol in light of a course of the characteristic curve.

2. The method as recited in claim 1, wherein the concentration of ethanol in the fuel mixture, which further includes at least one hydrocarbon compound, is determined.

3. The method as recited in claim 1, wherein at least one of closing and opening dynamics of the injector are ascertained as the dynamics.

4. The method as recited in claim 1, wherein the ascertained characteristic curve is compared to at least one reference characteristic for the dynamics of the injector, at least one first reference characteristic represents the dynamics of the injector for the case in which alcohol is injected by the injector as the only component of the fuel mixture, and at least one second reference characteristic represents the dynamics of the injector for the case in which a hydrocarbon compound is injected by the injector as the only component of the fuel mixture.

5. The method as recited in claim 4, wherein both the ascertained characteristic curve and the at least one reference characteristic represent a variation of the parameter describing the dynamics.

6. The method as recited in claim 5, wherein the dynamics are at least one of: i) an opening duration of the injector, ii) a closing duration of the injector, iii) an opening time of the injector, and iv) a closing time of the injector.

7. The method as recited in claim 1, wherein a lift curve of a valve needle of the injector is determined from the ascertained characteristic curve, and the concentration of alcohol is determined in light of the lift curve.

8. The method as recited in claim 1, wherein the characteristic curve is ascertained as a function of an injection time of the injector, and the concentration of alcohol is determined in light of the injection time.

9. A method for operating an internal combustion engine which burns a fuel mixture that contains a portion of alcohol, the method comprising:
    determining a concentration of alcohol in a mixture including ascertaining a characteristic curve for a parameter describing dynamics of an injector, by which the fuel mixture is injected in an internal combustion engine, and determining the concentration of alcohol in light of a course of the characteristic curve; and
    adjusting at least one operating parameter of the internal combustion engine as a function of a concentration of alcohol in the fuel mixture.

10. A system for determining a concentration of alcohol in a fuel mixture, the system comprising:
    a module configured to ascertain a characteristic curve for a parameter describing dynamics of an injector, by which the fuel mixture is injected in an internal combustion engine, the module also being configured to determine the concentration of alcohol in light of a course of the characteristic curve.

11. The system as recited in claim 10, wherein the module has a memory, in which a number of reference characteristics are stored; a reference characteristic represents the dynamics of the injector for a composition of the fuel mixture having a specific alcohol concentration, and the module is configured to determine the concentration of alcohol by comparing the ascertained characteristic curve to at least one of the reference characteristics.

* * * * *